Patented Oct. 21, 1941

2,259,503

UNITED STATES PATENT OFFICE 2,259,503

ETHERIFIED CATION EXCHANGING PHENOL-FORMALDEHYDE RESINS

Hans Wassenegger, Dessau in Anhalt, and Erhard Meier, Bitterfeld, Germany

No Drawing. Application July 7, 1938, Serial No. 218,014. In Germany July 13, 1937

2 Claims. (Cl. 260—49)

The present invention relates to a method for diminishing the swelling of phenol resins in aqueous solutions.

Phenol artificial resins, that is to say condensation products from monohydric and/or polyhydric phenols which contain ω sulfonic acid groups with aldehydes or their equivalents have generally the disturbing quality of more or less swelling in contact with water, alkalies or acids. This property is especially troublesome in the case of resins which have a gel character and are useful as cation exchangers.

This invention relates to a method of eliminating to a great extent this defect which consists in after-treating the resin with an etherifying agent. The usual etherifying agents are suitable for the method, for example alkyl halides, such as methyl chloride, methylene chloride, alkyl sulfates, toluene sulfonic esters or the like. When a cation exchanger is treated with such etherifying agents its capacity is surprisingly not essentially diminished. Indeed, calculated on the volume, it is rather increased. If any active group, for instance, sulfonic acid groups, have been blocked by the etherification, a subsequent saponifying treatment may be applied.

For example, a resin made by condensing the solution of 287 parts of resorcinol and 132 parts of sodium sulfite in 530 parts of water with 500 parts of formaline of 30 per cent. strength is dried and comminuted and separate portions are treated with the compounds respectively named in the following table. In each case there is an essential diminution of the capacity for swelling as compared with the untreated resin. The resin produced by the aforementioned condensation contains ω-sulfonic acid groups due to the use of the sodium sulfite.

| Resin treated with— | Water | Swelling percent produced by— | |
|---|---|---|---|
| | | Hydrochloric acid 1:1 | Caustic soda lye 1/10 N |
| Untreated | 130 | 40 | 225 |
| β,β'-dichlorether | 84 | 48 | 88 |
| Methyl chloride | 38 | 68 | 56 |
| Methylene chloride | 24 | 4 | 36 |
| Ethylene chloride | 64 | 28 | 64 |
| 1'3'-dichlor-1,3,4,6-tetramethylbenzene in methanol | 44 | 44 | 48 |

The invention is not limited to the exact details described, for obvious modifications will occur to a person skilled in the art.

What we claim is:

1. Insoluble cation exchanging resins comprising phenol-formaldehyde resins containing ω-sulfonic acid groups and etherified phenolic hydroxy groups, said resins being obtained by etherifying phenolic hydroxy groups of insoluble formaldehyde-phenol resins containing ω-sulfonic acid groups, said resins having little tendency to swell in the presence of aqueous solutions.

2. The products defined in claim 1, wherein said etherified phenolic hydroxy groups are chlormethoxy groups and wherein the etherification is effected by means of methylene chloride.

HANS WASSENEGGER.
ERHARD MEIER.